(12) United States Patent
Kim et al.

(10) Patent No.: US 12,325,885 B2
(45) Date of Patent: Jun. 10, 2025

(54) MIXED SUGAR COMPOSITION AND FOOD COMPOSITION CONTAINING SAME

(71) Applicant: CJ CHEILJEDANG CORPORATION, Seoul (KR)

(72) Inventors: Min Hoe Kim, Seoul (KR); Young Mi Lee, Seoul (KR); Ran Young Yoon, Seoul (KR); Sun Mi Shin, Seoul (KR); Eul-Soo Park, Seoul (KR); Sungkyun Lee, Seoul (KR); Youn-Kyung Bak, Seoul (KR); Seong Bo Kim, Seoul (KR); Eun Jung Choi, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 671 days.

(21) Appl. No.: 17/442,229

(22) PCT Filed: Mar. 26, 2020

(86) PCT No.: PCT/KR2020/004101
§ 371 (c)(1),
(2) Date: Sep. 23, 2021

(87) PCT Pub. No.: WO2020/204459
PCT Pub. Date: Oct. 8, 2020

(65) Prior Publication Data
US 2022/0186329 A1    Jun. 16, 2022

(30) Foreign Application Priority Data
Mar. 29, 2019 (KR) .......................... 10-2019-0037322

(51) Int. Cl.
*C13K 13/00* (2006.01)
*A23L 27/30* (2016.01)

(52) U.S. Cl.
CPC .............. *C13K 13/00* (2013.01); *A23L 27/33* (2016.08); *A23V 2002/00* (2013.01)

(58) Field of Classification Search
CPC ...... C13K 13/00; A23L 27/33; A23V 2002/00
See application file for complete search history.

(56) References Cited

U.S. PATENT DOCUMENTS

| | | | |
|---|---|---|---|
| 5,002,612 A | 3/1991 | Beadle et al. | |
| 2010/0105885 A1* | 4/2010 | Izumori | C12N 9/92 435/94 |

FOREIGN PATENT DOCUMENTS

| | | |
|---|---|---|
| CN | 103059071 A | 4/2013 |
| EP | 2098227 A1 | 9/2009 |
| JP | 2010-178683 A | 8/2010 |
| JP | 5283173 B2 | 9/2013 |
| JP | 5768098 B2 | 8/2015 |
| JP | 5943516 B2 | 7/2016 |
| JP | 2017-051107 A | 3/2017 |
| KR | 10-0190671 B1 | 1/1999 |
| KR | 10-0374450 B1 | 2/2003 |
| KR | 10-2012-0004492 A | 1/2012 |

OTHER PUBLICATIONS

English translation for JP2012236856 published Dec. 6, 2012 (also published as JP 5943516).*
English translation for CN103059071 published Apr. 24, 2013.*
Enlish translation for JP2010178683 published Aug. 19, 2010.*
Office Action issued Aug. 21, 2023 for corresponding Chinese Patent Application No. 202080024067.2.
International Search Report issued in corresponding International Patent Application No. PCT/KR2020/004101 dated Jun. 30, 2020.

* cited by examiner

*Primary Examiner* — Anthony J Weier
(74) *Attorney, Agent, or Firm* — Morgan, Lewis & Bockius LLP

(57) ABSTRACT

The present disclosure relates to a mixed sugar composition containing tagatose and sorbose.

20 Claims, No Drawings

MIXED SUGAR COMPOSITION AND FOOD COMPOSITION CONTAINING SAME

TECHNICAL FIELD

The present disclosure relates to a tagatose mixed sugar composition with improved quality.

BACKGROUND ART

Tagatose is a non-caloric sweetener that is hardly metabolized during the body absorption process, 15% to 20% of the tagatose intake amount is absorbed into the body, and this is absorption due to decomposition by microorganisms in the large intestine rather than human digestive ability and thus does not affect blood sugar levels. For this reason, replacing sugar with tagatose may be expected to have a glycemic control effect in diabetic patients, and it is known that replacing sugar with tagatose may help the reproduction of intestinal microorganisms and bowel movements due to microorganisms since a carbon source is supplied to the intestinal microorganisms. Moreover, tagatose has functional properties that do not cause tooth decay, and is thus a healthy sweetener that can be safely consumed by children when added to children's favorite chocolate, gum, bread, and candy instead of sugar, and at the same time, it has attracted attention as a substance that can contribute to the prevention of diseases caused by excessive sugar intake.

Meanwhile, sorbose is also known as a hexose monosaccharide and has a degree of sweetness about 70% that of sugar, and may be used to improve various physiological activities. Therefore, a sugar composition containing sorbose has been disclosed (Japanese Patent No. JP 5943516 B1, and the like), but there are no studies on the interaction between the sugar components constituting the mixed sugar composition and the effects acquired by the interaction or the physical properties of the sugar composition.

DISCLOSURE

Technical Problem

As a result of intensive research efforts, the present inventors have completed the present disclosure by developing a tagatose mixed sugar composition that shortens the time required for crystallization while having a high color value and purity.

Technical Solution

An object of the present disclosure is to provide a mixed sugar composition containing sorbose at more than 0 parts by weight and 5 parts by weight or less based on 100 parts by weight of the total weight of sorbose and tagatose.

Another object of the present disclosure is to provide a mixed sugar obtained using the composition as a crystallization mother liquor.

Another object of the present disclosure is to provide a food composition containing the mixed sugar.

Advantageous Effects

The composition of the present disclosure can provide tagatose crystals which have a high tagatose purity, are crystallized in a short time, and maintain color value stability, and thus can satisfy the aesthetic satisfaction of consumers, can be usefully used in the crystallization of tagatose, can be usefully applied to the separation and purification process of tagatose, and can contribute to the reduction of storage and transportation costs of tagatose powder and the improvement of an operating environment through the amelioration in flow characteristics of the powder.

DETAILED DESCRIPTION OF THE INVENTION

Each description and embodiment disclosed in the present disclosure may also be applied to other descriptions and embodiments. That is, all combinations of various elements disclosed in the present disclosure fall within the scope of the present disclosure. Further, the scope of the present disclosure is not limited by the specific description below.

Further, those skilled in the art will recognize, or be able to ascertain using no more than routine experimentation, many equivalents to the specific embodiments of the present disclosure described herein. Further, these equivalents should be interpreted to fall within the scope of the present disclosure.

An aspect of the present disclosure provides a mixed sugar composition containing sorbose at more than 0 parts by weight and 5 parts by weight or less based on 100 parts by weight of the total weight of sorbose and tagatose.

In the composition of the present disclosure, the sorbose content based on 100 parts by weight of the total weight of sorbose and tagatose may be more than 0 parts by weight and less than 20 parts by weight, specifically more than 0 parts by weight and 15 parts by weight or less, 10 parts by weight or less, less than 10 parts by weight, 9 parts by weight or less, 8 parts by weight or less. 7 parts by weight or less, 6 parts by weight or less, 5 parts by weight or less, 4 parts by weight or less, 3 parts by weight or less, 2.5 parts by weight or less, 2.3 parts by weight or less, 2.2 parts by weight or less, 2.1 parts by weight or less, 2 parts by weight or less, 1.5 parts by weight or less, 1 part by weight or less, 0.9 parts by weight or less, 0.8 parts by weight or less, 0.7 parts by weight or less, 0.6 parts by weight or less, 0.7 parts by weight or less, 0.6 parts by weight or less, 0.5 parts by weight or less, 0.4 parts by weight or less, 0.3 parts by weight or less, 0.2 parts by weight or less, 0.1 parts by weight or less, 0.005 parts by weight or less, 0.003 parts by weight or less, 0.001 parts by weight or less, or 0.0005 parts by weight or less, but is not limited thereto. In the composition of the present disclosure, the sorbose content based on 100 parts by weight of the total weight of sorbose and tagatose may be more than 0.00005 parts by weight and less than 20 parts by weight, specifically more than 0.00005 parts by weight and 15 parts by weight or less, 10 parts by weight or less, less than 10 parts by weight, 7 parts by weight or less, 5 parts by weight or less, 3 parts by weight or less, 2.5 parts by weight or less, 2.3 parts by weight or less, 2.2 parts by weight or less, 2.1 parts by weight or less, 2 parts by weight or less, 1.5 parts by weight or less, 1 part by weight or less, 0.9 parts by weight or less, 0.8 parts by weight or less, 0.7 parts by weight or less, 0.6 parts by weight or less, 0.7 parts by weight or less, 0.6 parts by weight or less, 0.5 parts by weight or less, 0.4 parts by weight or less, 0.3 parts by weight or less, 0.2 parts by weight or less, 0.1 parts by weight or less, 0.005 parts by weight or less, 0.003 parts by weight or less, 0.001 parts by weight or less, or 0.0005 parts by weight or less, but is not limited thereto.

Meanwhile, in the present disclosure, 0.0001 parts by weight based on 100 parts by weight of the total weight of a specific composition may be described as a content of "1 ppm". In other words, 0.5 ppm represents 0.00005 parts by weight and 5 ppm represents 0.0005 parts by weight based on 100 parts by weight of the total weight.

The composition of the present disclosure may have improved color value stability since the amount of change in color value of the composition over time is not large.

As used herein, the term "color value" is a value calculated based on the absorbance (A) at the maximum absorption wavelength ($\lambda_{max}$) in the visible region.

When light passes through a sample, the intensity of the light decreases because the light is absorbed by the sample. The (quantity of light passed through a sample solution (transmittance, T) is expressed as the intensity of light in the presence of a light-absorbing material (I) with respect to the intensity of light in the absence of a light-absorbing material ($I_0$), that is, $T=I/I_0$, and thus the ratio of light transmittance is always less than 1 and can be expressed as a percentage as follows:

As presented below, there is a certain correlation between absorbance (A) and percentage transmittance (% T).

A=Absorbance of the solution
% T=Percentage transmittance
A=2.00−log % T

In order to measure the color value of liquid sugar that is normally distributed, the percentage transmittance (% T) is measured at a wavelength of 420 nm and used as a standard by manufacturers or processing companies (Korea Food Research Institute, 1991.1).

The composition of the present disclosure does not have a large degree of change in color value compared to the existing compositions containing tagatose, thus may contain a smaller amount of pigments or additives for maintaining the stability thereof, and may be usefully used in foods, drugs, and various fields containing tagatose.

In the composition, the color value of the mixed sugar composition after 24 hours may be maintained at 90% or more based on 100% of the color value of the composition at 0 hours.

As used herein, the term "composition at 0 hours" means a composition before being stored, left to stand; or reacted in a specific environment for a certain period of time.

In the present disclosure, even when the time during which a specific composition is stored, left to stand, or reacted is not separately described as "more than 0 hours", it is self-evident that the time during which a specific composition is stored, left to stand, or reacted is more than 0 hours in light of common sense in the art, and the "composition at 0 hours" means a composition before being stored, left to stand, or reacted.

Therefore, in the present disclosure, the "composition at 0 hours" may be used interchangeably with terms such as "composition at the 0th hour", "composition before reaction", "start composition", or "initial composition".

In the present disclosure, the "composition after n hours" (any number where n>0) means a composition which has been left to stand, stored, or reacted in a specific environment for n hours. The specific environment may be defined by conditions such as temperature, pH, and humidity in an environment in which the composition is stored, left to stand, or reacted, but is not limited thereto.

Specifically, the temperature at which the composition is left to stand may be 0° C. to 100° C., 5° C. to 95° C., 10° C. to 90° C., 15° C. to 85° C., 20° C. to 80° C., 20° C. to 75° C., 20° C. to 70° C., 25° C. to 75° C., or 25° C. to 75° C., but is not limited thereto.

When the composition is stored, left to stand, or reacted for 120 hours, 108 hours, 96 hours, 84 hours, 72 hours, 60 hours, 48 hours, 36 hours, 24 hours, 12 hours, or 6 hours, the color value of the mixed sugar composition may be maintained at 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, or 65% or more based on 100% of the color value of the start composition, but is not limited thereto.

The "color value of the mixed sugar composition based on 100% of the color value of the start composition" may be calculated as {(color value of mixed sugar composition at specific time)/(color value of start composition)}×100 (%).

The composition of the present disclosure may have an improved crystallization kinetic.

As used herein, the term "crystallization" refers to a phenomenon in which a liquid or a solid in an amorphous state forms a crystal. The crystallization may be performed by way of crystallization methods known in the art, such as evaporation and concentration, cooling, adiabatic evaporation, and compound addition, but is not limited thereto.

In the present disclosure, "improved crystallization kinetics" or "fast crystallization kinetics" means that the crystallization kinetics are increased compared to a mixed sugar composition having a different composition ratio or compared to a sugar composition containing only one component.

Specifically, the improved crystallization kinetics may mean that the crystallization kinetics are increased compared to the crystallization kinetics of a composition having a sorbose content of 10 parts by weight or more based on 100 parts by weight of the total weight of sorbose and tagatose. More specifically, the improved crystallization kinetics may mean that the crystallization kinetics are faster than the crystallization kinetics of a mixed sugar composition having a sorbose content of 10, 11, 12, 13, 14, 15, 16, 17, 18, 19, or 20 parts by weight or more based on 100 parts by weight of the total weight of sorbose and tagatose, but the term is not limited thereto. Alternatively, the improved crystallization kinetics may mean that the crystallization kinetics are faster than the crystallization kinetics of a mixed sugar composition having a sorbose content of more than 0 parts by weight and 0.00005 parts by weight, 0.00004 parts by weight, 0.00003 parts by weight, or 0.00002 parts by weight or less based on 100 parts by weight of the total weight of sorbose and tagatose, or the crystallization kinetics of a composition having a sorbose content of 9 parts by weight or less, 8 parts by weight or less, 7 parts by weight or less, or 6 parts by weight or less and more than 5 parts by weight based on 100 parts by weight of the total weight of sorbose and tagatose, but the term is not limited thereto.

The crystallization kinetics in the present disclosure may be evaluated by measuring the crystallization rate. Specifically, the crystallization rate (%) may be calculated as (sum of concentrations of respective components of initial crystal mother liquor−sum of concentrations of respective components of crystal mother liquor at each time point)/(sum of concentrations of respective components of initial crystal mother liquor−sum of concentrations of respective components of crystal mother liquor at time point at which concentration does not change (crystallization is completed))×100 (%). The time point at which the concentration does not change in the calculation formula may be a time point at which the composition is in a crystal equilibrium state so that the degree of crystallization does not change even though time passes, and may be, for example, 72 hours or more at the storage temperature of the present disclosure. The "initial" in the "initial crystal mother liquor" may be interpreted as having the same meaning as "reaction for 0 hours". However, the percentage value in the formula is not necessarily limited to a percentage by weight, and may be interpreted as meaning parts by weight. The formula is only an example for expressing the crystallization rate, and the crystallization rate may be expressed by substituting a value based on 100 parts by weight of the entire composition into the same formula as above, or may be appropriately expressed in a way that can be understood using common sense in the art in order to indicate the crystallized portion with respect to the entire composition even if the same formula above is not used.

The composition of the present disclosure improves the crystallization kinetic, and thus can be usefully used for separation and purification of tagatose.

The composition of the present disclosure may have a crystallization rate of 40% or more after 24 hours.

Specifically, the composition may be one in which crystallization of the entire composition is completed within 6 hours, 12 hours, 24 hours, 36 hours, 48 hours, 60 hours, or 72 hours, but is not limited thereto. In an embodiment, when the crystallization rate is measured in a time range of 6 hours, 12 hours, 24 hours, 36 hours, 48 hours, 60 hours, or 72 hours, the composition may have a crystallization rate of 40%, 42%, 44%, 46%, 48%, 50%, 52%, 54%, 56%, 58%, 60%, 62%, 64%, 66%, 68%, 70%, 72%, 74%, 76%, 78%, 80%, 82%, 84%, 86%, 88%, 90%, 92%, 94%, 96%, 98%, or 99% or more, or the composition may be wholly crystallized and have a crystallization rate of 100%, but is not limited thereto.

The temperature of the environment for crystallizing the composition may be 0° C. to 90° C., 0° C. to 80° C., 0° C. to 70° C., 0° C. to 65° C., 0° C. to 60° C., 0° C. to 40° C., 5° C. to 35° C., 5° C. to 30° C., 5° C. to 25° C., 5° C. to 20° C., 10° C. to 30° C., 10° C. to 25° C., 15° C. to 25° C., 20° C. to 30° C., 5° C. to 95° C., 10° C. to 90° C., 15° C. to 85° C., 20° C. to 80° C., 20° C. to 75° C., 20° C. to 70° C. 25° C. to 75° C., or 25° C. to 65° C., but is not limited thereto. The "composition at 0 hours" is the same as described above.

Another aspect of the present disclosure provides a mixed sugar obtained using the mixed sugar composition of the present disclosure as a mother liquor.

Another aspect of the present disclosure provides a crystal composition containing tagatose and sorbose of the present disclosure.

The ratio of sorbose content to tagatose content in the crystal composition may be 0.00005:99.99995 to 9.5:90.5. Specifically, the sorbose content in the crystal may be 10 parts by weight, 9.5 parts by weight, 9 parts by weight, 8.5 parts by weight, 8 parts by weight, 7.5 parts by weight, 7 parts by weight, 6 parts by weight, 5 parts by weight, 4 parts by weight, 3 parts by weight, 2.5 parts by weight, 2 parts by weight, 1.5 parts by weight, or 1 part by weight or less and more than 0 parts by weight, 0.00005 parts by weight, 0.0001 parts by weight, 0.0002 parts by weight, 0.0003 parts by weight, 0.001 parts by weight, 0.003 parts by weight, or 0.01 parts by weight or more based on 100 parts by weight of the crystal, but is not limited thereto.

The mixed sugar obtained using the composition of the present disclosure as a mother liquor provides tagatose crystals having fast crystallization kinetics and improved color value stability, can contribute to the reduction of storage and transportation cost of tagatose powder and the improvement of operating environment through the amelioration in flow characteristics of the powder, and can be usefully used industrially.

Another aspect of the present disclosure provides a food composition containing the mixed sugar of the present disclosure.

The food composition of the present disclosure includes, but is not limited to, general food, health food, and medical (or patient) food compositions. Specifically, the food composition of the present disclosure may be beverages (for example, dietary fiber beverage, carbonated water, roasted grain powder drink and tea), alcoholic beverage bakery, sauces (for example, ketchup, pork cutlet sauce), dairy products (for example, fermented milk), meat products (for example, ham and sausage), a processed chocolate product, gum, candy, jelly, ice cream, syrup, dressing, snacks (for example, cookie and cracker), pickled fruits and vegetables (for example, fruit extracts, sugar pickled fruits, and red *ginseng* extract or red *ginseng* slices), meal replacements (for example, frozen food and HMR), or processed food. More specifically, the food composition may be a carbonated beverage composition, but is not limited thereto.

When the mixed sugar composition of the present disclosure is used in a food composition, the sweetener of the present disclosure may be added as it is or used together with other food ingredients, and may be appropriately used according to a common method. The food composition of the present disclosure may contain various flavoring agents or natural carbohydrates as additional ingredients. The natural carbohydrates are monosaccharides such as glucose and fructose, disaccharides such as maltose and sucrose, polysaccharides such as dextrin and cyclodextrin, and sugar alcohols such as xylitol, sorbitol, and erythritol. As the sweetener, natural sweeteners such as thaumatin and stevia extract or synthetic sweeteners such as saccharin and aspartame may be used.

In addition to the above, the food composition of the present disclosure may contain various nutrients, vitamins, electrolytes, flavoring agents, coloring agents, pectin and salts thereof, alginic add and salts thereof, organic adds, protective colloidal thickeners, pH adjusters, stabilizers, preservatives, glycerin, alcohols, carbonating agents used in carbonated beverages, and the like. In addition, the food composition of the present disclosure may contain natural fruit juice and flesh for the production of fruit juice beverages and vegetable beverages.

These ingredients may be used independently or in combination. Those skilled in the art may, appropriately select and add materials that may be commonly contained in the food composition, and the ratio of such additives may be selected in a range of 0.01 to 0.20 parts by weight per 100 parts by weight of the food composition of the present disclosure.

EXAMPLES

Hereinafter, the present disclosure will be described in more detail with reference to Examples and Experimental Examples. However, these Examples and Experimental Examples are for illustrative purposes of the present disclosure, and the scope of the present disclosure is not limited to these Examples and Experimental Examples.

Example 1: Examination of Color Value Stability

Reducing sugars easily form brown substances by heating and oxidation to cause browning of food, and greatly affect the aesthetic satisfaction of consumers in the quality of food containing the reducing sugars, and it is thus required to use a sugar source that hardly undergoes changes in color during storage. Therefore, in order to improve the color value stability of tagatose crystals, a mixed sugar composition containing a small amount of other saccharides was prepared, and the change in color value over time was measured.

Mixed sugars of Samples 1 to 9 having a sorbose content of 0.00005% (0.5 ppm) to 20% (w/w) with respect to the entire composition were prepared. The specific composition ratios in the samples are as presented in Table 1 below.

TABLE 1

| Division | Composition (%, w/w) | |
|---|---|---|
| | Sorbose | Tagatose |
| Sample 1 | 0.00005 | 99.99995 |
| Sample 2 | 0.00010 | 99.99990 |
| Sample 3 | 0.00050 | 99.99950 |
| Sample 4 | 0.00500 | 99.99500 |
| Sample 5 | 0.05000 | 99.95000 |
| Sample 6 | 0.50000 | 99.50000 |
| Sample 7 | 5.00000 | 95.00000 |
| Sample 8 | 10.00000 | 90.00000 |
| Sample 9 | 20.00000 | 80.00000 |

The mixed sugars of Samples 1 to 9 were diluted to a concentration of 60% (w/w), and then values relative to the initial color values were determined while the diluted mixed sugars of Samples 1 to 9 were left to stand at 70° C. The experiment was repeated three times in total.

Specifically, the color value was calculated by measuring the absorbance and percentage transmittance at a wavelength of 420 nm using a spectrophotometer (420 nm), the results were expressed as the color value at each time period relative to the color value at 0 hours, and the average value thereof is presented in Table 2.

In other words, the value presented in each cell of Table 2 is (color value at specific time period/color value at 0 hours)×100, and thus it indicates that the color value stability is higher as the value presented in Table 2 is larger. The superscript letters indicate that there is no statistically significant difference in the case of the same letter in the same row, and that there is a statistically significant difference in the case of different letters in the same row.

TABLE 2

| | Sample | | | | | | | | |
|---|---|---|---|---|---|---|---|---|---|
| | 1 | 2 | 3 | 4 | 5 | 6 | 7 | 8 | 9 |
| | Sorbose concentration | | | | | | | | |
| Time (h) | 0.5 ppm | 1 ppm | 5 ppm | 50 ppm | 500 ppm | 5,000 ppm | 50,000 ppm | 100,000 ppm | 200,000 ppm |
| 0 | 100.0 | 100.0 | 100.0 | 100.0 | 100.0 | 100.0 | 100.0 | 100.0 | 100.0 |
| 24 | $88.6^I$ | $90.7^H$ | $91.6^G$ | $92.1^F$ | $92.8^E$ | $93.6^D$ | $95.8^C$ | $97.0^B$ | $98.7^A$ |
| 48 | $82.3^I$ | $83.7^H$ | $85.0^G$ | $86.4^F$ | $87.5^E$ | $89.2^D$ | $91.5^C$ | $92.7^B$ | $93.3^A$ |
| 72 | $61.8^I$ | $64.6^H$ | $65.1^G$ | $65.4^F$ | $65.8^E$ | $67.2^D$ | $69.1^C$ | $69.5^B$ | $69.9^A$ |

In view of the results in Table 2, it can be seen that the tagatose color value is stably maintained over time in the compositions containing sorbose, From this, it has been confirmed that a higher sorbose concentration further affects the color value stability of tagatose crystals and the color value maintenance over time. In particular, it can be confirmed that the color value stability is excellent at a sorbose concentration of 1 ppm or more.

Example 2: Examination of Crystallization Kinetics

The concentration of mixed sugars of Samples 1 to 9 prepared in Example 1 was adjusted to 75% (w/w), and the change in crystallization rate (%) over time was measured three times while the prepared mixed sugars were left at 25° C., and the average thereof is presented in Table 3 below. The crystallization rate (%) is a value acquired by analyzing the concentration of the crystal mother liquor while crystallization proceeds, and converting the concentration at the time point at which the concentration does not change, that is, where crystallization does not proceed, to 100%. In other words, the crystallization rate (%) means (sum of concentrations of respective components of initial crystal mother liquor−sum of concentrations of respective components of crystal mother liquor at each time point)/(sum of concentrations of respective components of initial crystal mother liquor−sum of concentrations of respective components of crystal mother liquor at time point at which concentration does not change (crystallization is completed)) 100 (%) at each time point. The experiment was repeated three times in total.

The average value of the results acquired by the three measurements is presented in Table 3 below to compare the crystallization kinetics. The superscript letters indicate that there is no statistically significant difference in the case of the same letter in the same row, and that there is a statistically significant difference in the case of different letters in the same row.

TABLE 3

| | Sample | | | | | | | | |
|---|---|---|---|---|---|---|---|---|---|
| | 1 | 2 | 3 | 4 | 5 | 6 | 7 | 8 | 9 |
| | | | | | Sorbose concentration | | | | |
| Time (h) | 0.5 ppm | 1 ppm | 5 ppm | 50 ppm | 500 ppm | 5,000 ppm | 50,000 ppm | 100,000 ppm | 200,000 ppm |
| 0 | 0.0 | 0.0 | 0.0 | 0.0 | 0.0 | 0.0 | 0.0 | 0.0 | 0.0 |
| 24 | $37.8^F$ | $40.4^E$ | $41.1^D$ | $41.7^C$ | $44.8^B$ | $45.1^A$ | $45.2^A$ | $37.9^F$ | $32.4^G$ |
| 48 | $70.6^E$ | $79.9^D$ | $81.3^C$ | $82.4^B$ | $88.4^A$ | $88.6^A$ | $88.4^A$ | $68.4^E$ | $65.6^F$ |
| 72 | $85.6^D$ | $99.4^B$ | $100.0^A$ | $100.0^A$ | $100.0^A$ | $100.0^A$ | $100.0^A$ | $89.0^C$ | $82.1^D$ |

As a result of the experiment, it has been confirmed that the crystallization progress rate is excellent when the sorbose content is 5% (50,000 ppm) or less. It has been confirmed that the crystallization rate significantly decreases, particularly when the sorbose content is 10% or more, and the mixed sugar compositions having a sorbose content of 0.0001% or more or 5% or less have faster crystallization kinetics than the compositions having other sorbose mixing ratios.

From this, it can be seen that the mixed sugar obtained using the mixed sugar composition of the present disclosure having a sorbose content of 0.0001% or more or 5% or less as a crystallization mother liquor exhibits high tagatose color value stability and fast crystallization kinetics, and can thus be usefully used to improve tagatose quality.

Meanwhile, the purity of the compositions crystallized using the samples is as presented in Table 4.

TABLE 4

| | Sample | | | | | | | | |
|---|---|---|---|---|---|---|---|---|---|
| | 1 | 2 | 3 | 4 | 5 | 6 | 7 | 8 | 9 |
| | | | | | Sorbose concentration (ppm) | | | | |
| | 0.5 | 1 | 5 | 50 | 500 | 5,000 | 50,000 | 100,000 | 200,000 |
| Crystalline sorbose purity (%) | 0.00002 to 0.00012 | 0.00005 to 0.00021 | 0.00035 to 0.00132 | 0.00387 to 0.01126 | 0.02784 to 0.11547 | 0.34415 to 1.26457 | 1.41245 to 9.45247 | 7.65321 to 18.21457 | 12.34512 to 36.45123 |
| Crystalline tagatose purity (%) | 99.99988 to 99.99998 | 99.99979 to 99.99995 | 99.99868 to 99.99965 | 99.98874 to 99.99613 | 99.88453 to 99.97216 | 98.73543 to 99.65585 | 90.54753 to 98.58755 | 81.78543 to 92.34679 | 63.54877 to 87.65488 |

It can be seen that the tagatose purity in the crystal is high when a composition having a sorbose content of 5% (50,000 ppm) or less is used. From this, it can be seen that mixed sugars exhibiting high color value stability and crystals having fast crystallization kinetics can be obtained using compositions in which the sorbose content in mixed sugars is 0.0001% or more or 5% or less.

Based on the above description, it will be understood by those skilled in the art that the present disclosure may be implemented in a different specific form without changing the technical spirit or essential characteristics thereof. Therefore, it should be understood that the above embodiment is not limitative, but illustrative in all aspects. The scope of the present disclosure is defined by the appended claims rather than by the description preceding them, and thus all changes and modifications that fall within metes and bounds of the claims or equivalents of such metes and bounds are therefore intended to be embraced by the claims.

The invention claimed is:

1. A mixed sugar composition consisting of sorbose and tagatose, wherein a content of sorbose in the mixed sugar composition is more than 0 parts by weight and 1 part by weight or less based on 100 parts by weight of a total weight of sorbose and tagatose.

2. The composition according to claim 1, wherein the composition has a crystallization rate of 40% or more after 24 hours.

3. The composition according to claim 2, wherein a storage temperature of the composition is 0° C. to 90° C.

4. The composition according to claim 1, wherein a color value of the mixed sugar composition after 24 hours is maintained at 90% or more based on 100% of the color value of the composition at 0 hours.

5. The composition according to claim 4, wherein a storage temperature of the composition is 0° C. to 90° C.

6. A mixed sugar obtained using the composition according to claim 1 as a crystallization mother liquor.

7. A food composition comprising the composition according to claim 1.

8. A mixed sugar obtained using the composition according to claim 2 as a crystallization mother liquor.

9. A mixed sugar obtained using the composition according to claim 3 as a crystallization mother liquor.

10. A mixed sugar obtained using the composition according to claim 4 as a crystallization mother liquor.

11. A mixed sugar obtained using the composition according to claim 5 as a crystallization mother liquor.

12. A food composition comprising the composition according to claim 2.

13. A food composition comprising the composition according to claim 3.

14. A food composition comprising the composition according to claim 4.

15. A food composition comprising the composition according to claim 5.

16. The composition according to claim 1, wherein the composition has a crystallization rate of 70% or more after 48 hours.

17. The composition according to claim 1, wherein the composition has a crystallization rate of 84% or more after 72 hours.

18. The composition according to claim 1, wherein a color value of the mixed sugar composition after 48 hours is maintained at 80% or more based on 100% of the color value of the composition at 0 hours.

19. The composition according to claim 1, wherein a color value of the mixed sugar composition after 72 hours is maintained at 60% or more based on 100% of the color value of the composition at 0 hours.

20. The composition according to claim 1, wherein a content of sorbose in the mixed sugar composition is more than 0 parts by weight and 0.5 parts by weight or less based on 100 parts by weight of a total weight of sorbose and tagatose.

* * * * *